ly satisfactory result where the arm 1 has ten and the arm 2 has six perforations.

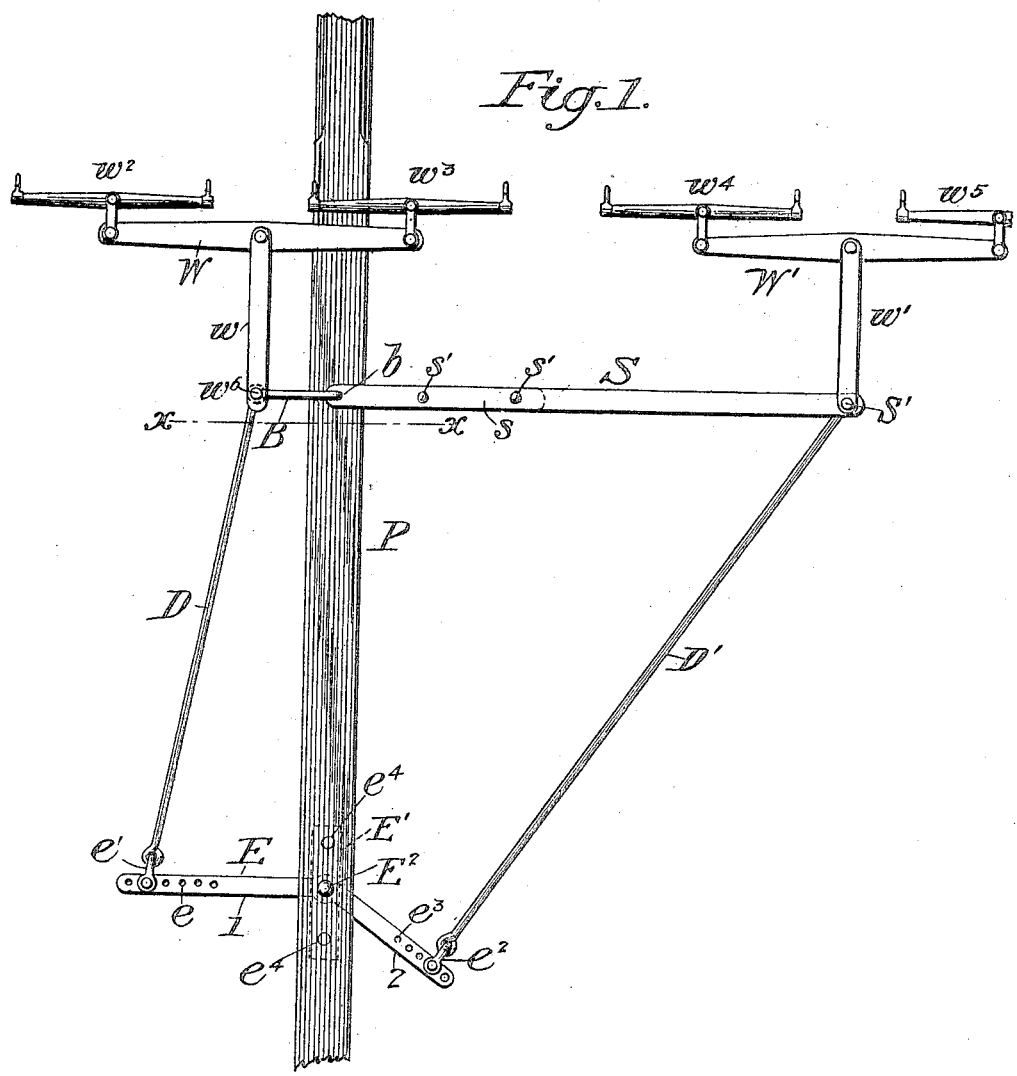
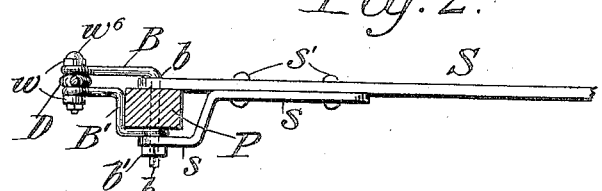

UNITED STATES PATENT OFFICE.

RUDOLPH MILLER, OF WHEATON, MINNESOTA.

DRAFT-EQUALIZER.

No. 818,038.  Specification of Letters Patent.  Patented April 17, 1906.

Application filed January 18, 1904. Serial No. 189,612.

*To all whom it may concern:*

Be it known that I, RUDOLPH MILLER, a citizen of the United States, residing at Wheaton, in the county of Traverse and State of Minnesota, have invented a certain new and useful Improvement in Draft-Equalizers, of which the following is a specification.

My invention relates to draft appliances, and particularly to such as are intended for use in agricultural machinery. Specifically stated, it comprises an equalizer for three, four, or more draft-animals to be used on binding or harvesting machines.

The object of my invention is first to improve the means of attachment of a draft-equalizer, and, second, by means of this and the general arrangement to secure a more perfectly-equalized draft for each of the animals. By it I am enabled to make adjustments to suit the strength of the individuals or of each team, entirely to obviate all side draft, and to conserve all the power, the strength of each animal being exerted to produce forward motion, no part of the power being expended in resistance or backward motion on the part of one animal against the forward motion of another.

My improved method of attachment and the adjustments by which I attain the ends sought fully appear in the accompanying drawings and are hereinafter described, and the novel features pointed out in the appended claim.

In the drawings, Figure 1 is a plan view of my equalizer as it appears attached to a left-hand-cut binder. Fig. 2 is a view taken on the line $x\ x$ of Fig. 1 looking forward and with the pole in section.

Referring to Fig. 1, P is the draft-pole of a binder or similar machine arranged, as stated, for a left-hand cut.

As my invention relates to the draft appliances only, I have not illustrated any of the working parts of the binder, and it is to be understood that the same may be of any well-known type and that by simply reversing the parts it can be adjusted as a right-hand-cut machine. In such machines it is not only important that the underlying principles shall be correct and correctly applied, but that the parts most exposed to wear shall be simple, easy of adjustment, and not difficult to repair or replace in the field, especially in regions where fine shop-work and the services of highly-skilled mechanics are seldom available.

$w^2$, $w^3$, $w^4$, and $w^5$ are the swingletrees, assuming that two teams are to be employed. These swingletrees are attached in the usual manner to doubletrees W W', from which the draft is communicated through iron straps $w$ and $w'$, preferably double, to the combination-bar B and the cross-brace S, respectively. The part S, to which I have referred as a "brace," is preferably hollow and may be conveniently formed of one-inch tubing about four feet long and perforated at both ends. About two feet to the rear of the point of attachment of the brace S the equalizer-lever E is secured to the pole or tongue P by means of a through-bolt $E^2$. This equalizer-lever is preferably a casting of malleable iron having two arms 1 and 2, forming an obtuse angle with its opening to the rear and strengthened at its middle or pivotal point by raised flanges on both sides, the opening for the bolt $E^2$ passing through the metal thus thickened, whereby a long bearing is secured on the bolt to distribute the wear thereon. The upper side of the lever has the face of its flange raised against the under surface of the tongue P, in which a suitable wear-plate may be fitted or upon which heavy friction disks or washers may be placed. Beneath the lever E a curved strap E' is secured lengthwise of the tongue by means of bolts $e^4$, as shown in dotted lines in Fig. 1. The through-bolt $E^2$ extends down through the tongue, through the interposed wear-plate or washers and the lever E, and through the strap E', on the under side of which it receives a suitable nut or nuts.

The arm 1 of the equalizer-lever, which is on the grain side of the machine, is provided with a series of perforations $e$ for the reception of the bolt securing a clevis $e'$, upon which is secured the eye of the connecting-rod D, the forward end of which is secured to the strap $w$ in a manner to be referred to.

The outside arm 2 of the equalizer-lever is also provided with a series of perforations $e^3$ to receive the bolt of a clevis $e^2$, upon which is secured the eye of the connecting-rod D', whose forward end is formed into a similar eye secured upon the bolt S' at the outer end of the brace S. The number of perforations in the two arms of the equalizer-lever may of course be varied at will; but I have found a convenient number in practice to be six for the arm 1 and five for the arm 2.

The means of attachment of the brace S and the parts D and w to the tongue P constitute an important part of my invention. It is necessary to have these parts as few in number and as simple in design as possible without sacrificing efficiency. I have reduced the number of these parts to two—viz., the overlying combination bar and bolt B and the underlying brace B'. These are best shown in Fig. 2, where the tongue P and the rod D are shown in section, while the brace S is broken off short of the end. The inner end of the brace S is perforated, as stated, and lies upon the upper face of the tongue. A strap s is secured upon the lower face of the brace S, as by rivets or bolts s', and has its end bent down and extending across the lower face of the tongue, being perforated at a point directly beneath the perforation in the brace S. The brace B', which is conveniently formed as an iron strap one and a half inches wide, is bent to fit against the side of the tongue P, one end extending beneath the same and perforated and the other end extending out and lying beneath the eye of connecting-rod D and the strap w. The combination bar and bolt B has its outer end formed into an eye overlying the eye of connecting-rod D and is bent at its middle point at an angle of ninety degrees, as shown at b, this vertical portion b forming a pivot-bolt which is passed down through the perforation in brace S through the tongue P, through the perforated end of brace B', and through the strap s, being threaded at its lower end to receive the nut or nuts b', by means of which all these parts are secured together. The outer ends of the bar B and the brace B' receive the bolt $w^6$, which passes through the strap w, the bar and brace, and the eye of rod D, and has a nut or nuts threaded upon it.

The operation of my improved arrangement thus described is apparent from the drawings and the description. It will be observed that without sacrificing the independent motions of the doubletrees, and while permitting adjustment of the connecting-rods on the arms 1 and 2 to give a greater or less relative leverage on either side, I have simplified the intermediate mechanism to a very considerable degree. In fact, apart from the direct-draft appliances, which are common to all machines, and excepting the common bolts and clevises, there are only seven separate parts required, two of which are plain rods and the others of such simple design that their repair or replacement should be well within the power of any ordinary mechanic.

It will be understood that the relative proportions of the various parts shown in the drawings may be altered and many minor changes made without departing from the scope of my invention.

Other metals than those mentioned may be employed and the connections may be reversed, if desired. Such changes are contemplated, and the language of my description is therefore to be taken as explanatory and not necessarily limiting in its effect.

In the following claim I have referred to the tongue or pole as a "common-draft" member, to the straps w w' as "direct-draft" members, and to the parts B B' and S as "intermediate" members. These definitions are given for the sake of clearness and not as specific limitations.

Having thus described my invention, what I claim, and desire to secure by Letters Patent, is—

A draft-equalizer comprising in combination the following instrumentalities: a draft-tongue, a bell-crank equalizing-lever having its arms set at an obtuse angle and pivoted on the inside of the tongue at the point of intersection of the arms, the length of said arms being inversely proportional to the distances from the tongue of the lines of draft appertaining to the respective arms, a clevis associated with each arm and a number of holes in each to receive the bolt of the clevis for purposes of adjustment, a link extending forwardly from each clevis, a strap constituting a forward extension of each link, whiffletrees pivotally attached to the forward ends of the straps, a pivotal connection between each strap and link, a bolt through the same forming the pivot, a long transverse brace formed as a flat strap, resting at one end with its flat face on the upper face of the tongue, and extending at substantially right angles therefrom to the pivotal connection between the longer link and its whiffletree-strap, the outer end of the brace being perforated to receive the pivot-bolt of the link and strap, and the brace being itself presented edgewise to the direction of strain, a supplemental strap riveted to the inner end of the brace upon its lower face, and bent down to form a fork embracing the tongue between its bifurcations, a combination bar and bolt having its outer end formed into an eye to receive the pivot-bolt of the short draft-link and its strap, the inner end of the said bar being bent down at right angles to its body and passed through an eye in the flat brace, a pivot-opening in the tongue, and a registering eye in the lower supplemental strap, the projecting end of the bolt being threaded to receive a suitable nut, a supplemental bar with eyes at both ends and bent to serve as a brace against the side of the tongue, being secured between the pivot-bolt of the link and strap at the outer end, and the tongue-bolt on the inner end, all bent and arranged substantially as described, whereby a perfect distribution of stresses is attained, adjustment of opposite drafts may be had to equalize the same, and the whiffletrees and their portions of the direct-draft mechanism will lie upon the upper face of the tongue, while the equalizing-lever is attached upon the lower face thereof, rendering the attachment more secure for heavy strains.

In testimony whereof I have hereunto set my hand this 27th day of October, A. D. 1903, in the presence of two subscribing witnesses.

RUDOLPH MILLER.

Witnesses:
   G. L. H. TUCKER,
   F. W. MURPHY.